United States Patent [19]
Sasaki

[11] Patent Number: 5,497,333
[45] Date of Patent: Mar. 5, 1996

[54] CONTROL SYSTEM FOR INTEGRALLY CONTROLLING OPERATIONS OF ELECTRONIC TORQUE SPLIT SYSTEM AND TRACTION CONTROL SYSTEM FOR AUTOMOTIVE VEHICLE

[75] Inventor: Hiroki Sasaki, Yokohama, Japan

[73] Assignee: Nissan Motor Co., Ltd., Yokohama, Japan

[21] Appl. No.: 106,559

[22] Filed: Aug. 16, 1993

[30] Foreign Application Priority Data

Sep. 3, 1992 [JP] Japan .................... 4-235879

[51] Int. Cl.$^6$ .............................................. B60K 17/348
[52] U.S. Cl. .............................. 364/426.03; 364/426.02; 180/197; 180/248
[58] Field of Search ................... 364/426.02, 426.03; 180/197, 248; 123/333, 483

[56] References Cited

U.S. PATENT DOCUMENTS

| | | | |
|---|---|---|---|
| 4,989,686 | 2/1991 | Miller et al. | 364/426.03 |
| 5,002,147 | 3/1991 | Tezuka et al. | 364/426.02 |
| 5,079,708 | 1/1992 | Brown | 364/426.02 |
| 5,126,942 | 6/1992 | Matsuda | 364/426.03 |
| 5,141,071 | 8/1992 | Edahiro et al. | 364/426.03 |
| 5,157,611 | 10/1992 | Ikeda et al. | 364/426.02 |
| 5,168,955 | 12/1992 | Naito | 364/426.03 |
| 5,172,319 | 12/1992 | Shiraishi et al. | 364/426.03 |
| 5,222,570 | 6/1993 | Kawamura et al. | 180/197 |
| 5,262,952 | 11/1993 | Tsuyama et al. | 364/426.03 |
| 5,270,930 | 12/1993 | Ito et al. | 364/426.03 |
| 5,270,933 | 12/1993 | Fennel et al. | 364/426.02 |
| 5,291,408 | 3/1994 | Thatcher | 364/426.03 |
| 5,315,519 | 5/1994 | Chin et al. | 364/426.02 |
| 5,328,006 | 7/1994 | Tsuyama et al. | 180/197 |
| 5,365,443 | 11/1994 | Tsuyama et al. | 180/197 |
| 5,388,658 | 2/1995 | Ando et al. | 180/197 |
| 5,428,539 | 6/1995 | Kawamura et al. | 364/426.02 |

FOREIGN PATENT DOCUMENTS

| | | |
|---|---|---|
| 63-149236 | 6/1988 | Japan . |
| 63-170129 | 7/1988 | Japan . |
| 4-103847 | 4/1992 | Japan . |

*Primary Examiner*—Kevin J. Teska
*Assistant Examiner*—Tyrone V. Walker
*Attorney, Agent, or Firm*—Foley & Lardner

[57] ABSTRACT

An integrated control system for integrally controlling operations of an electronic torque split system and a traction control system for an automotive vehicle is provided. This system is such that when slippage of auxiliary driven wheels to which engine torque is variably delivered exceeds an auxiliary wheel target slippage value which is determined in a preselected relation to a cornering condition, the torque split system modifies an amount of engine torque distribution to the auxiliary wheels so that the auxiliary wheel slippage is adjusted toward the auxiliary wheel target slippage value, while the traction control system is activated to reduce an excess of engine torque constantly delivered to primary driven wheels for maintaining primary driven wheel slippage within a preselected allowable range.

14 Claims, 3 Drawing Sheets

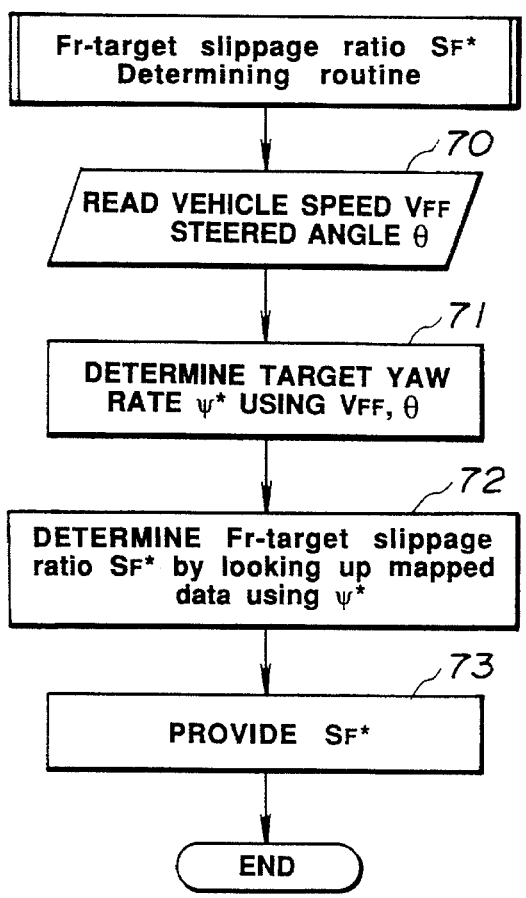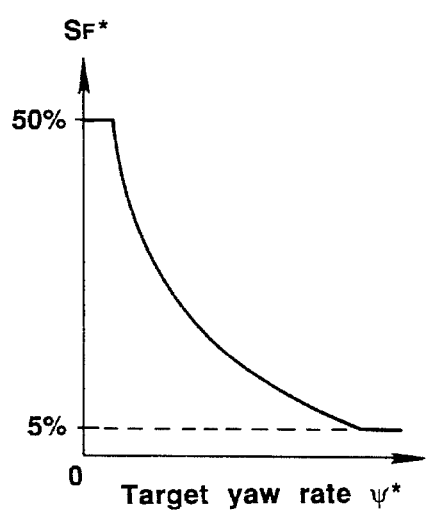
FIG.3(a)
FIG.3(b)

5,497,333

CONTROL SYSTEM FOR INTEGRALLY CONTROLLING OPERATIONS OF ELECTRONIC TORQUE SPLIT SYSTEM AND TRACTION CONTROL SYSTEM FOR AUTOMOTIVE VEHICLE

BACKGROUND OF THE INVENTION

1. Field of The Invention

The present invention relates generally to a vehicle performance/safety enhancing system. More particularly, the invention is directed to an integrated control system for controlling operations of an electronic torque-split system and a traction control system.

2. Description of The Prior Art

Japanese Patent First Publication (tokkai) No. 4-103847 discloses a conventional integrated control system for an electronic torque split system and a traction control system incorporated in a 4WD vehicle. This system is adapted to project a road surface friction coefficient when wheelspin occurs at all four wheels while engine torque is delivered to front wheels and to reduce the driving torque of the wheels based on the projected value, thereby restricting the wheelspin to improve accelerating and cornering stabilities.

In the above prior art control system, whether the vehicle is traveling straight or cornering, the occurrence of four-wheel wheelspin is constantly monitored for traction control. Therefore, there is no problem when the vehicle travels straight. However, when the four-wheel wheelspin is created during cornering, engine torque is reduced only after cornering forces of the front wheels have been decreased greatly with the result that the vehicle is subject to understeering prior to the reduction in engine torque under the traction control.

SUMMARY OF THE INVENTION

It is therefore a principal object of the present invention to avoid the disadvantages of the prior art.

It is another object of the invention to provide a control system which is operable to integrally control operations of an electronic torque split system and a traction control system for preventing a vehicle from being subject to understeering during cornering.

According to one aspect of the present invention, there is provided a combination of a torque split system and a traction control system for an automotive vehicle including pairs of front and rear wheels, one of the pairs being a primary driven wheel pair to which engine torque is constantly delivered and the other being an auxiliary driven wheel pair to which the engine torque is variably delivered, which comprises a primary driven wheel slippage detecting means for detecting primary driven wheel slippage and providing a signal indicative thereof, an auxiliary driven wheel slippage detecting means for detecting auxiliary driven wheel slippage and providing a signal indicative thereof, a cornering condition detecting means for detecting a cornering condition of the vehicle and providing a signal indicative thereof, and a controlling means, responsive to the signals from the primary driven wheel slippage detecting means, the auxiliary driven wheel slippage detecting means, and the cornering condition detecting means, for controlling operations of the torque split control system and the traction control system, when the auxiliary driven wheel slippage exceeds an auxiliary driven wheel target slippage value which is determined in a preselected relation to the cornering condition detected by the cornering condition detecting means, the controlling means activating the torque split system to modify an amount of engine torque distribution to the auxiliary driven wheel pair so that the auxiliary driven wheel slippage is adjusted toward the auxiliary driven wheel target slippage value, while the traction control system is activated to modify driving torque of the primary driven wheel pair for maintaining the primary driven wheel slippage within a preselected allowable range.

In the preferred mode, the auxiliary driven wheel target slippage value may be determined based on a yaw rate of the vehicle. Additionally, the auxiliary driven wheel target slippage value is decreased as the yaw rate is increased. The yaw rate is determined based on vehicle speed and a steered angle of the front wheels.

When the primary driven wheel slippage exceeds the primary driven wheel target slippage value, the traction control system may reduce the driving torque of the primary driven wheel pair so that the primary driven wheel slippage is adjusted to within the preselected allowable range which is defined by preselected upper and lower threshold values varying in a preselected relation to vehicle speed.

Further, when the auxiliary driven wheel slippage exceeds the auxiliary driven wheel target slippage value, the torque split system modifies an engine torque distribution ratio of the auxiliary driven wheel pair to the primary driven wheel pair so that the auxiliary driven wheel slippage is adjusted toward the auxiliary driven wheel target slippage value.

BRIEF DESCRIPTION OF THE DRAWINGS

In the drawings:

FIG. 3(a) is a flowchart which represents a sub-routine in a flowchart as shown in FIG. 2.

FIG. 3(b) is a graph which shows a relation between a front-wheel target slippage ratio $S_F^*$ and a target yaw rate $\phi^*$.

DESCRIPTION OF THE PREFERRED EMBODIMENT

Figure 1:
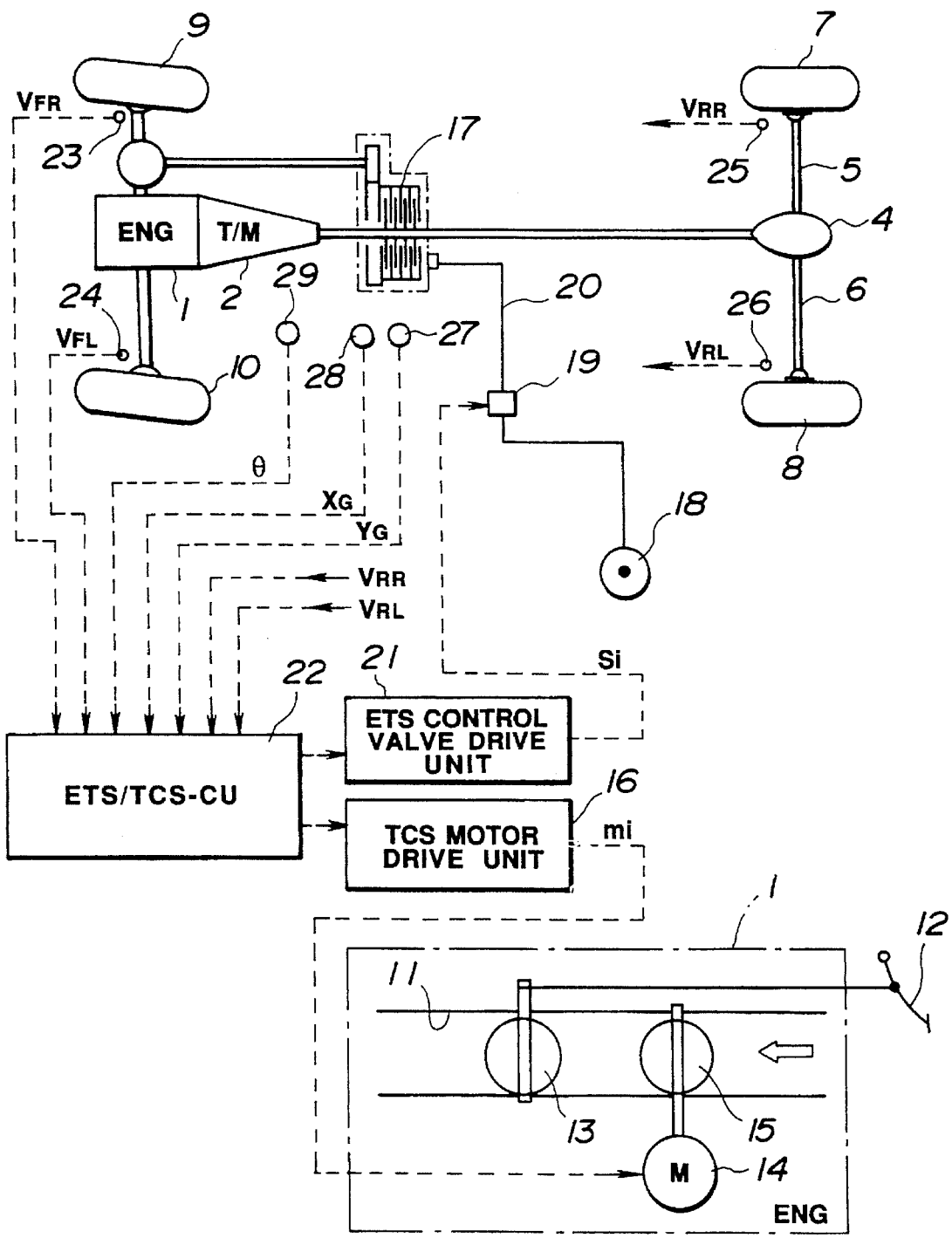
FIG. 1 is a block diagram which shows an integrated control system for an electronic torque-split system and a traction control system according to the present invention.

Referring now to the drawings, particularly to FIG. 1, there is shown an integrated control system for an Electronic Torque-split System (ETS) and a Traction Control System (TCS) according to the present invention which is applied to a vehicle having a four-wheel drive (4DW) system.

The 4WD system has a F-R (front engine—rear wheel drive) type drive train which includes generally an engine 1, a transmission 2, a propeller shaft 3, a rear differential gear 4, drive shafts 5 and 6 rotatably supporting rear wheels 7 and 8, and a transfer clutch 17 for variably transmitting engine torque to front wheels 9 and 10.

The electronic torque-split system includes an electronic torque-split control valve drive unit 21 (hereinafter referred to as an ETS control valve drive unit) which serves to variably control a degree of engagement of the transfer clutch 17 to modify a front to rear wheel torque distribution ratio. The transfer clutch 17 is hydraulically connected to a hydraulic power source 18 through a solenoid-operated hydraulic control valve 19 arranged in a hydraulic line 20. The ETS control valve drive unit 21 provides control current Si to the control valve 19 to regulate a hydraulic pressure level in the line 20 for controlling clutch engagement of the transfer clutch 17.

The traction control system is operable to vary a throttle opening degree to modify engine power upon occurrence of wheel slippage during acceleration so that the amount of rear-wheel slippage is adjusted to within an optimal allowable range. The traction control system includes a mechanical throttle valve 13 operatively connected to an accelerator pedal 12, a motor-driven throttle valve 15, and a traction control motor drive unit 16 (hereinafter referred to as a TCS motor drive unit). The throttle valve 15 is arranged in an intake air passage 11 in parallel to the throttle valve 13, and is controlled by an electric throttle motor 14. The TCS motor drive unit 16 provides control current mi to the throttle motor 14 for modifying the amount of intake air.

The integrated control system further includes an ETS/TCS control unit 22, a front-right wheel speed sensor 23, a front-left wheel speed sensor 24, a rear-right wheel speed sensor 25, a rear-left wheel speed sensor 26, a lateral acceleration sensor 27, a longitudinal acceleration sensor 28, and a steered angle sensor 29. The wheel speed sensors 23 to 26 are adapted to detect wheel speeds respectively to provide wheel speed indicative signals $V_{FR}$, $V_{FL}$, $V_{RR}$, and $V_{RL}$. The lateral acceleration sensor 27 detects lateral acceleration acting on a vehicle body to provide a lateral acceleration indicative signal YG. Likewise, the longitudinal acceleration sensor 28 detects longitudinal acceleration acting on the vehicle body to provide a longitudinal acceleration indicative signal XG. The steered angle sensor 29 detects a steered wheel angle to determine a steered angle of the front wheels 9 and 10 to provide a steered angle indicative signal θ. Based on these sensor signals, the ETS/TCS control unit 22 integrally controls the ETS control valve drive unit 21 and the TCS motor drive unit 16.

Figure 2:
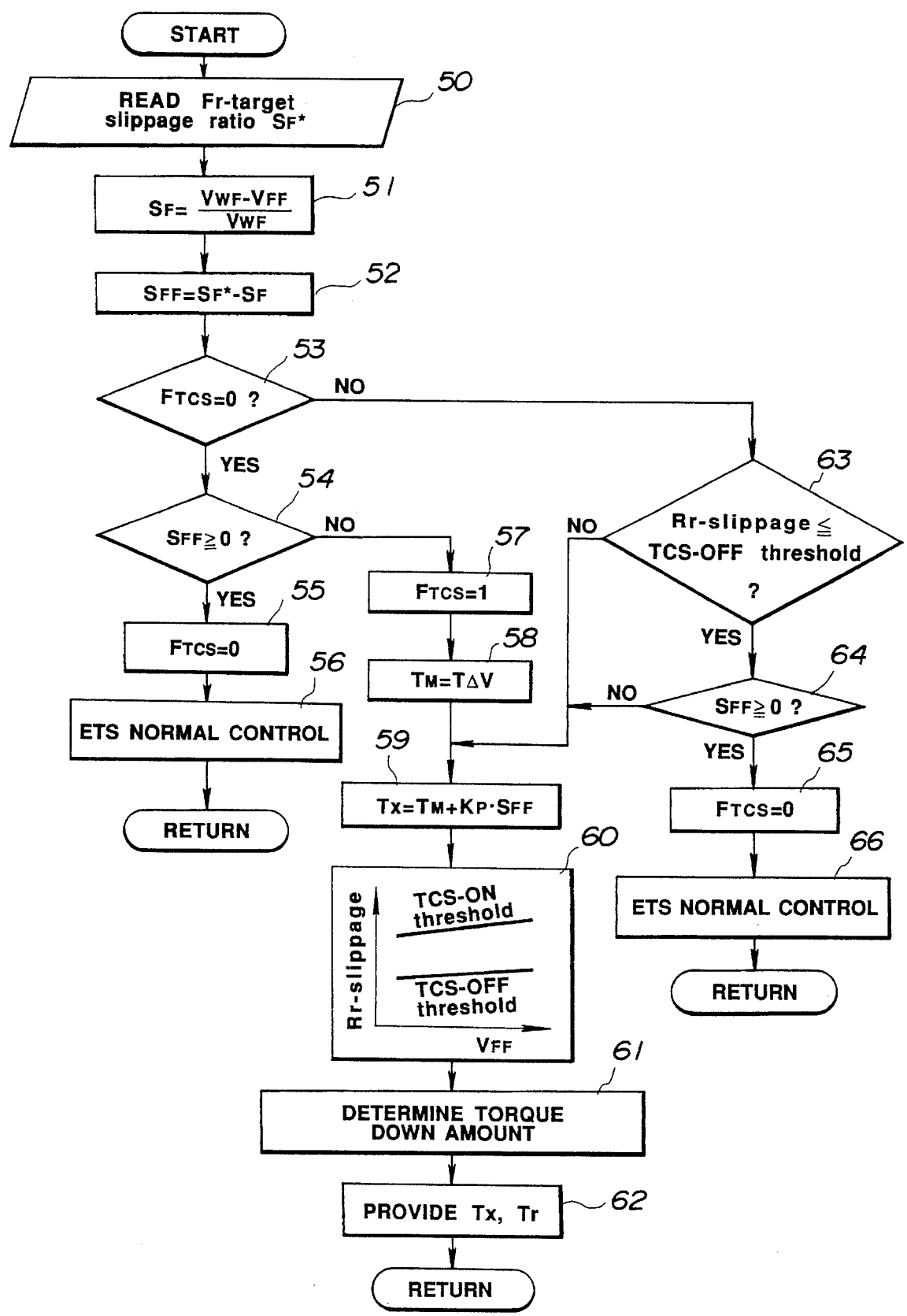
FIG. 2 is a flowchart of a program or sequence of logical steps performed by an integrated control system as shown in FIG. 1.

Referring to FIG. 2, there is shown a flowchart of a program or sequence of logical steps performed by the ETS/TCS control unit 22 for controlling operations of the electronic torque-split and traction control systems.

After entering the program, the routine proceeds to step 50 wherein a front-wheel target slippage ratio $S_F^*$ calculated in a sub-routine, as will be referred to hereinafter in detail, is read.

The routine then proceeds to step 51 wherein a front-wheel slippage ratio $S_F$ is determined according to the following relation using a vehicle speed $V_{FF}$ and an average front-wheel speed $V_{WF}$.

$$S_F = (V_{WF} - V_{FF})/V_{WF}$$

where the vehicle speed VFF is determined by integrating the longitudinal acceleration XG with respect to time which is monitored by the longitudinal acceleration sensor 28.

The routine then proceeds to step 52 wherein a front-wheel slippage ratio deviation $S_{FF}$ is derived by subtracting the front-wheel slippage ratio $S_F$ from the front-wheel target slippage ratio $S_F^*$ ($S_{FF} = S_F^* - S_F$). The routine then proceeds to step 53 wherein it is determined whether a traction control flag $F_{TCS}$ represents zero or not. This determination is made for determining if the traction control system is now operating. If a YES answer is obtained ($F_{TCS} = 0$), concluding that the traction control is not in service, the routine then proceeds to step 54 wherein it is determined whether the front-wheel slippage ratio deviation $S_{FF}$ is greater than or equal to zero or not ($S_{FF} \geq 0$?). If a YES answer is obtained, concluding that the front-wheel slippage ratio $S_F$ does not exceed the front-wheel target slippage ratio $S_F^*$, the routine then proceeds to step 55 wherein the traction control flag $F_{TCS}$ is cleared to zero. Afterwards, the routine proceeds to step 56 wherein normal torque split control is initiated. For example, the normal torque split control is such as to control the degree of engagement of the transfer clutch 17 based on parameters of a front-rear wheel speed difference ΔV and a control gain of torque distribution to the front wheels 9 and 10. Under this control, the engagement of the transfer clutch 17 is increased according to increase in the front-rear wheel speed difference ΔV, while the control gain is decreased as the lateral acceleration YG becomes small. Note that the front-rear wheel speed difference ΔV is determined by subtracting the average front-wheel speed $V_{WF}$ from an average rear-wheel speed $V_{WR}$.

If a NO answer is obtained in step 54 ($S_{FF} > 0$), concluding that the front-wheel slippage ratio $S_F$ exceeds the front-wheel target slippage ratio $S_F^*$ the routine then proceeds to step 57 wherein the traction control is initiated and the traction control flag $F_{TCS}$ is set to one (1). The routine then proceeds to step 58 wherein a clutch torque control value ΔV which is provided in the torque split system for engagement control of the transfer clutch 17 is set to a basic torque control value $T_M$. The routine then proceeds to step 59 wherein an ETS clutch torque control value $T_X$ is mathematically calculated by adding the clutch torque control value TΔV equal to $T_M$ to a torque correction value $K_P \cdot S_{FF}$ ($T_X = T\Delta V + K_P \cdot S_{FF}$) wherein $K_P$ is a proportional constant and $K_P \cdot S_{FF}$ represents a greater negative value as an absolute value of the front-wheel slippage ratio deviation $S_{FF}$ is increased. In other words, the ETS clutch torque control value $T_X$ is decreased as the front-wheel slippage ratio $S_F$ becomes greater than the front-wheel target slippage ratio $S_F^*$.

The routine then proceeds to step 60 wherein the vehicle speed $V_{FF}$ and a rear-wheel slippage ($V_{WR} - V_{FF}$) are respectively compared with traction control threshold values (a TCS-ON threshold value, a TCS-OFF threshold value) which are plotted in a map as shown. The routine then proceeds to step 61 wherein an engine torque-down control value $T_r$ is mathematically determined based on the amount of the rear-wheel slippage ($V_{WR} - V_{FF}$) when the rear-wheel slippage exceeds the TCS-ON threshold value. The routine then proceeds to step 62 wherein the ETS clutch torque control value $T_X$ and the engine torque-down control value $T_r$ are provided to the ETS control valve drive unit 21 and the TCS motor drive unit 16 respectively so that the transfer clutch 17 is controlled based on the ETS clutch torque control value $T_X$ to modify the driving torque distribution to the front wheels 9 and 10 and the motor-driven throttle valve 15 is controlled based on the engine torque-down control value $T_r$ to modify the engine output.

If a NO answer is obtained in step 53, concluding that the traction control flag $F_{TCS}$ presents one (1), or the traction control is in operation, the routine then proceeds to step 63 wherein it is determined whether the rear-wheel slippage ($V_{WR} - V_{FF}$) is smaller than the TCS-OFF threshold value or not. If a NO answer is obtained, the routine then proceeds to step 59 as explained previously. Alternatively, if a YES answer is obtained, the routine then proceeds to step 64 wherein it is determined whether the front-wheel slippage ratio deviation $S_{FF}$ is greater than or equal to zero or not. If a NO answer is obtained, concluding that the front-wheel slippage ratio $S_F$ exceeds the front-wheel target slippage ratio $S_F^*$, the routine then proceeds to step 59. Alternatively, if a YES answer is obtained in step 64, concluding that the front-wheel slippage ratio $S_F$ is less than the front-wheel target slippage ratio $S_F^*$, the routine then proceeds to step 65 wherein the traction control is not initiated and the traction control flag $F_{TCS}$ is set to zero. Afterwards, the routine proceeds to step 66 wherein the torque split control system carries out normal torque split control.

Referring to FIG. 3(a), a flowchart is shown which represents the sub-routine for calculating the target front-wheel slippage ratio $S_F^*$.

In step 70, the ETS/TCS control unit 22 monitors the vehicle speed $V_{FF}$ and the front-wheel steered angle θ. The routine then proceeds to step 71 wherein a target yaw rate φ* is derived base on the vehicle speed $V_{FF}$ and the front-wheel steered angle θ in a manner, as will be described hereinafter in detail.

The routine then proceeds to step 72 wherein the front-wheel target slippage ratio $S_F^*$ is derived by look-up using mapped data, as shown in FIG. 3(b), based on the target yaw rate $_c$*. As can be seen in the table, the front-wheel target slippage ratio $S_F^*$ assumes inverse proportion characteristics wherein the front-wheel target slippage ratio $S_F^*$ is decreased as the target yaw rate φ* is increased. The routine then proceeds to step 73 wherein the front-wheel target slippage ratio $S_F^*$ is provided for determining the front-wheel slippage ratio derivation $S_{FF}$ in the main routine, as already mentioned.

In operation, when a vehicle is traveling straight, the target yaw rate φ* of zero or a small value is provided. The front-wheel target slippage ratio $S_F^*$ is then set to 504 according to the mapped data in FIG. 3(b). Therefore, in step 52 of the main routine, as shown in FIG. 2, the front-wheel slippage ratio deviation $S_{FF}$ becomes greater than zero as the front-wheel slippage ratio $S_F$ is essentially zero and thus the routine flows to steps 53, 54, 55, 56, and 56. Under such conditions, the traction control is not performed, while the torque split control system carries out the normal torque split control.

Accordingly, upon the front-rear wheel rotational speed difference ΔV occurring due to slippage of the rear wheels 7 and 8 when the vehicle starts or accelerates, the transfer clutch 17 is controlled to be engaged more tightly so that the amount of engine torque distribution to the front wheels 9 and 10 is increased, thereby restricting the rear-wheel slippage to enhance starting and accelerating stabilities.

Additionally, in the event that the front wheels 9 and 10 slip slightly caused by the increase in driving torque delivered thereto, these slippages are allowed because the front-wheel target slippage ratio $S_F^*$ is set to a relatively higher value of 50%, thereby producing a feeling of acceleration of interest to a driver.

When the vehicle is turned while accelerating on a road surface having a relatively low friction coefficient μ and the target yaw rate φ* becomes great, the front-wheel target slippage ratio $S_F^*$ is, as shown in FIG. 3(b), set to a relatively small value of 5%, for example. Additionally, in such turning conditions, the front-wheel slippage ratio $S_F$ tends to be increased because of the low friction road surface, the difference in speed between the front and rear wheels due to turning radius difference, and the driving torque distribution to the front wheels 9 and 10.

Therefore, in the case of a first, or initial control cycle of the flowchart in FIG. 3 wherein the traction control flag $F_{TCS}$ represents zero and the front-wheel slippage ratio deviation $S_{FF}$ becomes smaller than zero ($S_{FF}$<0) as the front-wheel slippage ratio $S_F$ exceeds the front-wheel target slippage ratio $S_F^*$ of 5%, the routine flows from step 54 to steps 57, 58, 59, 61, and 62. Alternatively, in a subsequent control cycle, since the traction control flag $F_{TCS}$ has been set to one (1) in the initial control cycle, the routine flows from steps 63 or 64 to steps 59, 60, 61, and 62. The torque split control system controls the transfer clutch 17 to decrease the amount of the driving torque distribution to the front wheels 9 and 10 according to the magnitude of the front-wheel slippage ratio deviation $S_{FF}$ while increasing the amount of the driving torque distribution to the rear wheels 7 and 8. Additionally, the traction control system performs the traction control to reduce the torque output from the engine 1 by closing the motor-driven throttle valve 15 so that the rear-wheel slippage ($V_{WR}$–$V_{FF}$) is converged to within the optimal allowable range.

Afterwards, when the rear-wheel slippage becomes smaller than the TCS-ON threshold value and the front-wheel slippage ratio deviation $S_{FF}$ become greater than zero ($S_{FF}$=0), the routine flows from step 64 to steps 65 and 66 wherein the motor-driven throttle valve 15 is fully opened under the traction control and the torque split control is returned to normal.

Therefore, it will be appreciated that the vehicle can be expected to be subjected to understeering when encountering a condition wherein the front-wheel slippage ratio $S_F$ exceeds the front-wheel target slippage ratio $S_F^*$ which is defined by the target yaw rate φ*

In the event that the condition wherein the vehicle shows understeering exist, the front wheels 9 and 10 are controlled by the torque split system to decrease the amount of the driving torque distribution thereto so that the front-wheel slippage ratio $S_F$ is converged toward the front-wheel target slippage ratio $S_F^*$. This increases cornering forces of the front wheels 9 and 10, thereby preventing the vehicle from being subjected to understeering.

In addition, the rear wheels 7 and 8 are controlled by the traction control system to restrict the rear-wheel slippage to within the optimal allowable range in a manner wherein the motor-driven throttle valve 15 is closed to reduce engine torque so that an excess of driving torque delivered to the rear wheels under the torque split control is eliminated. This assures high driving performance.

As explained above, the integrated control system according to the invention is such that when the front-wheel slippage ratio $S_F$ exceeds the front-wheel target slippage ratio $S_F^*$ during turning, the front wheels 9 and 10 are feed-back controlled by the torque split system so that the front-wheel slippage $S_F$ is adjusted to the front-wheel target slippage ratio $S_F^*$, while the rear wheels 7 and 8 are controlled by the traction control system closing the motor-driven throttle valve 15 to reduce the engine torque for maintaining the rear-wheel slippage within the optimal allowable range. Therefore, even under a cornering condition wherein the vehicle is subjected to understeering, suitable steering characteristics may be obtained, assuring traveling stability and desired acceleration characteristics.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, while the above embodiment utilizes the motor-driven throttle valve 15 to modify engine power for recovering traction of wheels, a system may be employed for the traction control which is capable of performing braking control, ignition timing control, and/or split engine control which operates a multicylinder engine using only some of the cylinders.

Additionally, the above embodiment is applied to the rear wheel drive-based 4WD vehicle, however, the system of the invention is applicable to a front wheel drive-based 4WD vehicle.

What is claimed is:

1. A combination of a torque split system and a traction control system for an automative vehicle, said vehicle including pairs of front and rear wheels, one of said pairs being a primary driven wheel pair to which engine torque is constantly delivered and the other being an auxiliary driven wheel pair to which the engine torque is variably delivered, comprising:

primary driven wheel slippage detecting means for detecting primary driven wheel slippage and providing a signal indicative thereof;

auxiliary driven wheel slippage detecting means for detecting auxiliary driven wheel slippage and providing a signal indicative thereof;

cornering condition detecting means for detecting a cornering condition of the vehicle and providing a signal indicative thereof; and controlling means, responsive to the signals from said primary driven wheel slippage detecting means, said auxiliary driven wheel slippage detecting means, and said cornering condition detecting means, for controlling operations of the torque split control system and the traction control system, wherein when the auxiliary driven wheel slippage exceeds an auxiliary driven wheel target slippage value which is determined in a preselected relation to the cornering condition detected by said cornering condition detecting means, said controlling means activates the torque split system to modify an amount of engine torque distribution to the auxiliary driven wheel pair so that the auxiliary driven wheel slippage is adjusted toward the auxiliary driven wheel target slippage value, and activates the traction control system to modify driving torque of the primary driven wheel pair for maintaining the primary driven wheel slippage within a preselected allowable range.

2. A combination as set forth in claim 1, wherein said auxiliary driven wheel target slippage value is determined based on a yaw rate of the vehicle.

3. A combination as set forth in claim 2, wherein said auxiliary driven wheel target slippage value is decreased as the yaw rate is increased.

4. A combination as set forth in claim 3, wherein the yaw rate is determined based on vehicle speed and a steered angle of the front wheels.

5. A combination as set forth in claim 1, wherein when the primary driven wheel slippage exceeds the primary driven wheel target slippage value, the traction control system reduces the driving torque of the primary driven wheel pair so that the primary driven wheel slippage is adjusted to within the preselected allowable range which is defined by preselected upper and lower threshold values varying in a preselected relation to vehicle speed.

6. A combination as set forth in claim 1, wherein when the auxiliary driven wheel slippage exceeds the auxiliary driven wheel target slippage value, the torque split system modifies an engine torque distribution ratio of the auxiliary driven wheel pair to the primary driven wheel pair so that the auxiliary driven wheel slippage is adjusted toward the auxiliary driven wheel target slippage value.

7. A combination of a torque split system and a traction control system for an automative vehicle, said vehicle including pairs of front and rear wheels, one of said pairs being a primary driven wheel pair to which engine torque is constantly delivered and the other being an auxiliary driven wheel pair to which the engine torque is variably delivered, said torque split system variably modifying a torque distribution ratio to said primary and auxiliary driven wheel pairs in accordance with a difference between a rotation speed of said primary driven wheel pair and a rotation speed of said auxiliary driven wheel pair, and a lateral acceleration of said vehicle, comprising:

primary driven wheel slippage detecting means for detecting primary driven wheel slippage and providing a signal indicative thereof;

auxiliary driven wheel slippage detecting means for detecting auxiliary driven wheel slippage and providing a signal indicative thereof;

cornering condition detecting means for detecting a cornering condition of the vehicle and providing a signal indicative thereof; and controlling means, responsive to the signals from said primary driven wheel slippage detecting means, said auxiliary driven wheel slippage detecting means, and said cornering condition detecting means, for controlling operations of the torque split control system and the traction control system, wherein when the auxiliary driven wheel slippage exceeds an auxiliary driven wheel target slippage value which is determined in a preselected relation to the cornering condition detected by said cornering condition detecting means, said controlling means activates the torque split system to modify an amount of engine torque distribution to the auxiliary driven wheel pair so that the auxiliary driven wheel slippage is adjusted toward the auxiliary driven wheel target slippage value, and activates the traction control system to modify driving torque of the primary driven wheel pair for maintaining the primary driven wheel slippage within a preselected allowable range.

8. A combination of a torque split system and a traction control system for an automotive vehicle, said vehicle including pairs of front and rear wheels, one of said pairs being a primary driven wheel pair to which engine torque is constantly delivered and the other being an auxiliary driven wheel pair to which the engine torque is variably delivered, comprising:

primary driven wheel slippage detecting means for detecting primary driven wheel slippage and providing a signal indicative thereof;

auxiliary driven wheel slippage detecting means for detecting auxiliary driven wheel slippage and providing a signal indicative thereof;

cornering condition detecting means for detecting a yaw rate condition of the vehicle and providing a signal indicative thereof; and controlling means, responsive to the signals from said primary driven wheel slippage detecting means, said auxiliary driven wheel slippage detecting means, and said cornering condition detecting means, for controlling operations of the torque split control system and the traction control system, wherein when the auxiliary driven wheel slippage exceeds an auxiliary driven wheel target slippage value which is determined in a preselected relation to the yaw rate condition detected by said cornering condition detecting means, said controlling means activates the torque split system to modify an amount of engine torque distribution to the auxiliary driven wheel pair so that the auxiliary driven wheel slippage is adjusted toward the auxiliary driven wheel target slippage value, and activates the traction control system to modify driving torque of the primary driven wheel pair for maintaining the primary driven wheel slippage within a preselected allowable range.

9. A combination as set forth in claim 8, wherein said auxiliary driven wheel target slippage value is decreased as the yaw rate is increased.

10. A combination as set forth in claim 9, wherein the yaw rate is determined based on vehicle speed and a steered angle of the front wheels.

11. A combination as set forth in claim 8, wherein when the primary driven wheel slippage exceeds the primary driven wheel target slippage value, the traction control system reduces the driving torque of the primary driven wheel pair so that the primary driven wheel slippage is adjusted to within the preselected allowable range which is defined by preselected upper and lower threshold values varying in a preselected relation to vehicle speed.

12. A combination as set forth in claim 8, wherein when the auxiliary driven wheel slippage exceeds the auxiliary driven wheel target slippage value, the torque split system modifies an engine torque distribution ratio of the auxiliary driven wheel pair to the primary driven wheel pair so that the auxiliary driven wheel slippage is adjusted toward the auxiliary driven wheel target slippage value.

13. A combination as set forth in claim 1, wherein said controlling means activates the torque split system before activating the traction control system.

14. A combination as set forth in claim 8, wherein said controlling means activates the torque split system before activating the traction control system.

* * * * *